United States Patent [19]
Rodgers

[11] Patent Number: 4,487,017
[45] Date of Patent: Dec. 11, 1984

[54] EXHAUST MIXER FOR TURBOFAN AEROENGINE

[75] Inventor: Leonard J. Rodgers, Spondon, England

[73] Assignee: Rolls-Royce Limited, London, England

[21] Appl. No.: 408,133

[22] Filed: Aug. 13, 1982

[30] Foreign Application Priority Data

Sep. 3, 1981 [GB] United Kingdom ............... 8126750

[51] Int. Cl.³ .................................................. F02K 3/02
[52] U.S. Cl. .......................................... 60/262; 60/264; 181/220; 239/265.17
[58] Field of Search .................... 60/262, 264, 271; 181/220, 222, 213; 239/265.17, 265.19, 265.13, 127.3

[56] References Cited

U.S. PATENT DOCUMENTS 3,153,319 10/1964 Young et al. ............... 239/265.19
4,175,640 11/1979 Birch et al. .................... 60/262
4,217,756 8/1980 Laskody ........................ 60/262
4,302,934 12/1981 Wynosky et al. ............... 60/262
4,401,269 8/1983 Eiler ............................ 60/262

FOREIGN PATENT DOCUMENTS 2082259A 3/1982 United Kingdom .

Primary Examiner—Carlton R. Croyle
Assistant Examiner—Jeffrey A. Simenauer
Attorney, Agent, or Firm—Cushman, Darby & Cushman

[57] ABSTRACT

An exhaust mixer for a turbofan aeroengine can be classified as being of the multi-lobed type, with troughs between the lobes. Good mixing efficiency together with good aerodynamics, short axial length and low weight is achieved by forming the mixer from flow surfaces which are longitudinally twisted between their upstream and downstream ends, opposing sides of each lobe and trough being of opposite twist. Between the upstream and downstream ends of the twisted flow surfaces, their latitudinal contours become approximately S-shaped so as to define outer portions of the lobes, inner portions of the troughs and the opposed sides of the lobes and troughs.

9 Claims, 7 Drawing Figures

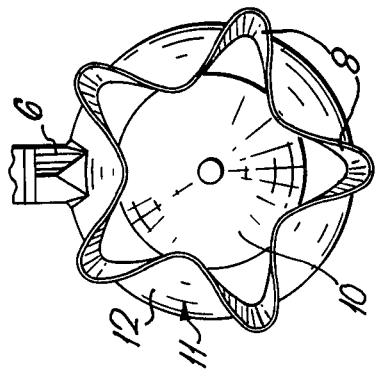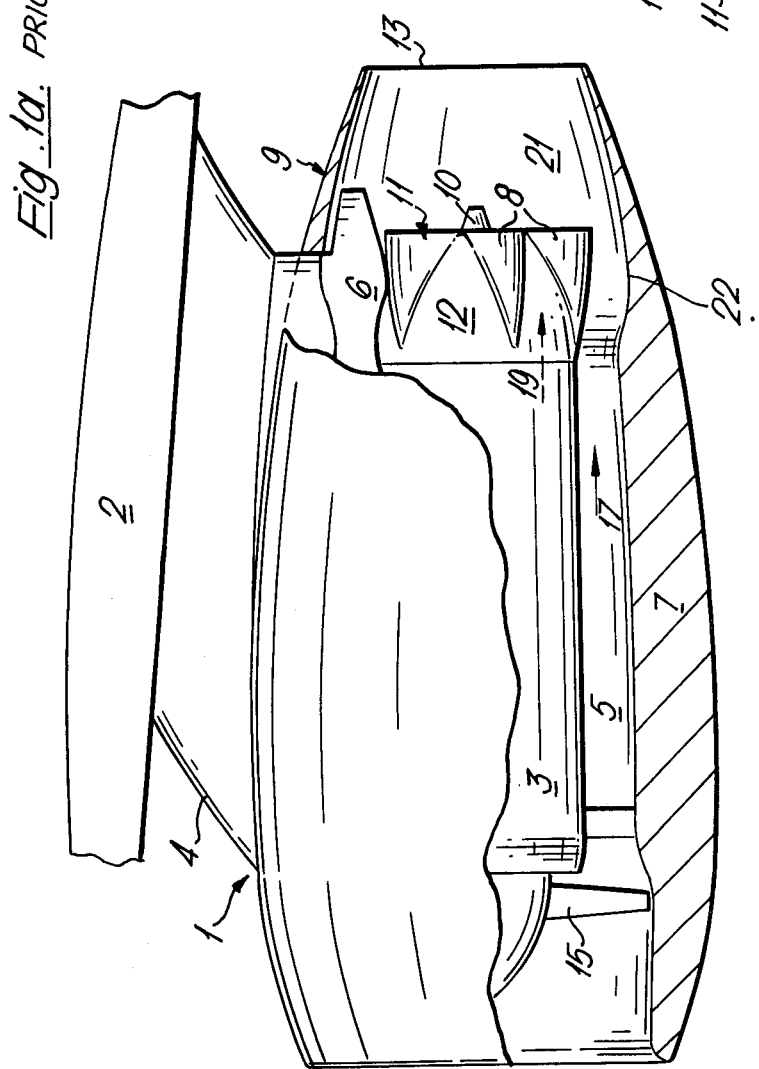

EXHAUST MIXER FOR TURBOFAN AEROENGINE

The present invention relates to exhaust flow mixers for turbo-fan aeroengines in which the turbine exhaust gases and the fan air are mixed with each other before exit from a propulsion nozzle. For convenience, the invention can be classified as a multi-lobe type of mixer.

It is known to mix the turbine exhaust stream with the fan air from the bypass stream using the multi-lobed and multi-chuted types of exhaust mixer in a so-called "mixed flow" type of turbofan propulsor. Such mixers improve the propulsion efficiency of this type of aeroengine by projecting portions of the two streams into each other and increasing the area of contact between them, resulting in a transfer of thermal energy from the hot turbine exhaust stream to the cooler bypass stream. 100% mixing efficiency would result in a uniform temperature for the combined streams at the propulsion nozzle, the mixing process having been allowed to proceed to completion in a long duct between the mixer and the propulsion nozzle. More realistic figures for mixing efficiency, bearing in mind the restricted length of duct available for mixing in a turbofan, are 50% to 70% approximately. It is important to note that even small improvements in the mixing efficiency can significantly improve the propulsive efficiency of a mixed flow turbofan, allowing lower specific fuel consumption, or alternatively giving increased propulsive thrust at the propulsion nozzle.

The object of mixer design is therefore to maximise the contribution of the mixer to mixing efficiency whilst minimising mixer weight and the thrust losses inherent in the mixing process itself. Note too that if a mixer of short axial length can be made to give a good mixing efficiency, then the length of duct needed for mixing can also be reduced, leading to weight savings for the engine; alternatively the duct can be maintained at the same length as for a lower efficiency mixer, the "extra" length being used to improve mixing efficiency even more.

According to the present invention, in an exhaust mixer for a turbofan aeroengine there are turbine exhaust stream contacting flow surfaces and fan air stream contacting flow surfaces which together at least partially define lobes through which portions of the turbine exhaust stream pass and troughs (between the lobes) through which portions of the fan air stream pass; each lobe and trough has generally opposed sides which extend longitudinally (i.e. stream wise) of the turbine exhaust and fan air streams, the flow surfaces being longitudinally twisted between their upstream and downstream ends such that the opposing sides of each lobe and each trough comprise flow surface portions having opposed senses of twist, the shape of the flow surfaces being such that transverse of the streamwise direction, the latitudinal contours of the flow surfaces at a succession of stations intermediate their upstream and downstream ends are sinuous shapes each with a single inflexion, said sinuous latitudinal contours having outwardly convex portions which at least partially delineate outer portions of the lobes, inwardly concave portions which at least partially delineate inner portions of the troughs, and intermediate portions between said outwardly convex and inwardly concave portions, which intermediate portions at least partially delineate said opposed sides of the lobes and troughs.

Considering the above, it will be realised that one side of each lobe or trough, as the case may be, comprises a flow surface portion having a longitudinal clockwise twist between its upstream and downstream ends, and the other side of each lobe or trough comprises a complementary flow surface portion having a similar but anticlockwise twist. The portions of the turbine exhaust and fan air streams which flow through the lobes and troughs are influenced by these twisted flow surfaces and leave their trailing edges having been given rotational components of velocity in addition to their basic rearwards velocity, i.e. they leave the trailing edges of the flow surfaces as multiple helical flows. The adjacent helical flows so produced interact with each other and mix quickly, as explained in the specification, the sinuous contours mentioned above being a means of combining the helical flow-producing advantages of the twist in the flow surfaces with good aerodynamic characteristics for the shape of the lobes and troughs. The twisted shape of the flow surfaces also enable a mixer of short axial length and light weight to be produced, particularly when the twist, though progressive between upstream and downstream ends of the flow surfaces, is non-uniform in that the degree of twist per unit length of the flow surfaces is greater at their downstream ends than their upstream ends.

The shapes of the flow surfaces comprising the lobes and troughs can be specified more fully by reference to their latitudinal contours, which steadily change from uninflected curves extending peripherally of the turbine exhaust stream at the upstream ends of the flow surfaces, to the sinuous curves already mentioned, then to further uninflected curves at a succession of stations closer to and at the downstream ends of the flow surfaces. Thus, the opposed sides of the lobes and troughs are delineated by mid-portions of the sinuous curves and by outwardly extending portions of the further uninflected curves, outer portions of the lobes are at least partly delineated by outwardly convex portions of the sinuous curves, and inner portions of the troughs are delineated by inwardly concave portions of said sinuous curves and by inwardly concave portions of said further uninflected curves.

An embodiment of the invention will now be described by way of example only with reference to the accompanying drawings in which:

FIG. 1a shows a part-sectioned side view in diagramatic form of a turbofan aeroengine fitted with an exhaust mixer of known type;

FIG. 1b shows a rear and elevation of the exhaust mixer of FIG. 1a, but with some surrounding engine structure removed;

Figure 2:
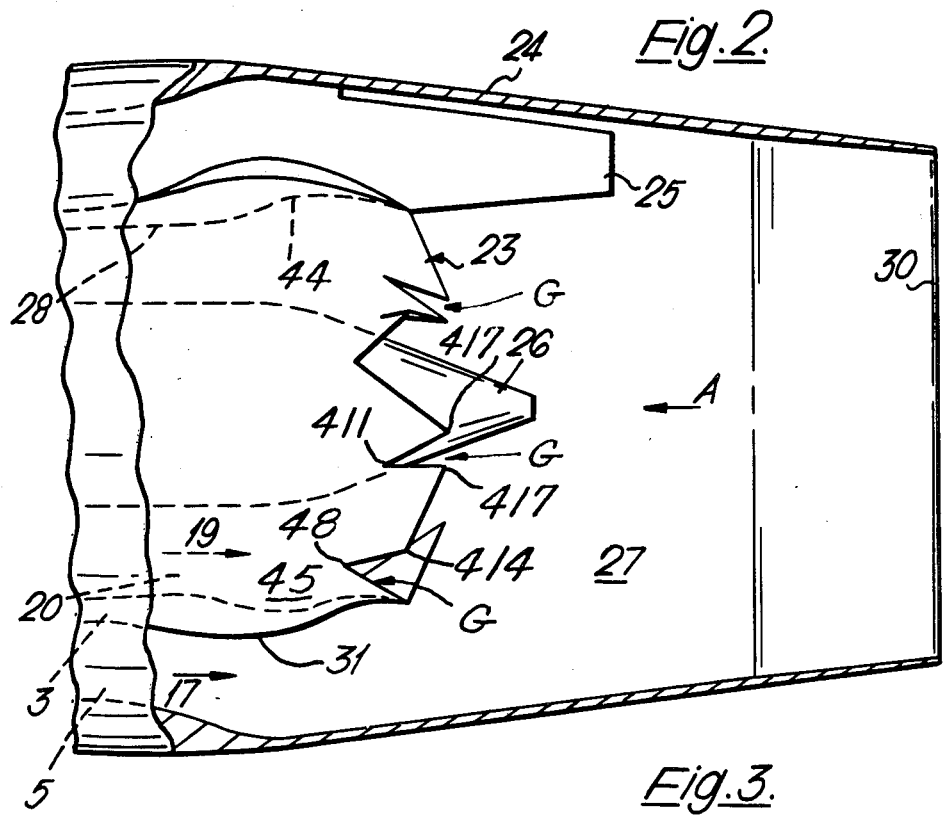
FIG. 2 shows a part-sectioned side view of the rear part of the turbofan aeroengine of FIG. 1 as modified and fitted with an exhaust stream mixer in accordance with the present invention.

The drawings are not to scale.

Referring first to FIGS. 1a and 1b which represent a known design of mixed stream turbofan, a turbofan aeroengine 1 has: an engine core 3; a bypass duct 5 defined by casing and nacelle 7, which surrounds the core 3; and an exhaust system 9, including an exhaust bullet 10, a five-lobed exhaust mixer 11, and a final propulsive exhaust nozzle 13. The bypass duct 5 is supplied with bypass air from front fan 15, which also supplies core 3, the fan 15 being driven from a turbine (not shown) in core 3. The fan air stream 17 and the turbine exhaust stream 19 pass over and through the mixer 11 and are partially mixed in the exhaust mixing duct 21 of exhaust system 9 before passing to atmosphere through propulsion nozzle 13.

Turbofan 1 is supported from the underside of a wing 2 of an aircraft (not shown) by means of a pylon 4 which extends through the nacelle and fan duct casing and across the top sector of fan duct 5, being attached to core 3. A portion 6 of the pylon 4 extends across the fan duct 5.

In the turbofan 1, the fan stream 17 is a low temperature, low velocity flow, whilst the turbine exhaust stream 19 is a high temperature, high velocity flow. Were these two streams to be allowed to issue from propulsion nozzle 13 without first being forcibly mixed internally of the engine, mixing would proceed naturally for a considerable number of nozzle diameters downstream of the nozzle 13, the velocity and temperature disparity between the turbine exhaust stream 19 aand the surrounding fan stream 17 causing a significant amount of "jet noise" throughout the mixing zone. Inclusion of the exhaust stream mixer 11 within the engine 1 ensures that by the time the combined efflux exits from propulsion nozzle 13, the noisiest part of the mixing process has been accomplished in the mixing duct 21. Note that use of an internal mixer 11 allows absorption of mixing noise as it arises by means of sound absorbing linings (not shown) on the exhaust mixing duct wall 22.

Another significant benefit is realised in terms of an increase in thrust at the propulsion nozzle relative to an unmixed jet. It can be thermodynamically proved that the sum of the thrusts available from a hot high velocity turbine exhaust stream surrounded by a cool low velocity fan air stream is less than the thrust available from a homogeneous jet resulting from thorough mixing of turbine exhaust and fan air streams before exit from the propulsion nozzle. Since greater thrust is being produced per unit weight of fuel burnt, efficient mixing of the two streams in this way increases the fuel economy of the engine.

It will be seen from FIGS. 1a and 1b that the five lobes 8 of the exhaust mixer progressively flare directly out of what is basically a frustro-conical nozzle surface 12, producing an end elevation which is corrugated, with troughs between the lobes, the lobes tending to channel portions of the turbine exhaust stream 19 outwards into the surrounding fan air stream 17, and the troughs tending to channel portions of the fan air stream inwards into the interior of the turbine exhaust stream.

In FIG. 2, the aeroengine 1 of FIG. 1 has been modified to receive an exhaust stream mixer 23 which is in accordance with the invention. The major modifications to the aeroengine 1 are made in nacelle 24, pylon 25 and exhaust bullet 26 (FIGS. 2 and 3) and are required because of the different aerodynamic and dimensional requirements of mixer 23 compared with mixer 11. Mixer 23 is of relatively short axial length but of relatively high mixing efficiency. It receives the fan air stream 17 from bypass duct 5 and the turbine exhaust stream 19 from turbine exhaust duct 20 and starts the mixing process, which continues downstream in mixing duct 27. The short length of mixer 23 allows a relatively long mixing duct 27 to be employed without incurring an unacceptable penalty in terms of the weight of nacelle structure 24 required to define it, plus the weight of the mixer. Propulsion nozzle 30 is of the plain conical type and is defined by the downstream end of nacelle 24.

Figure 3:
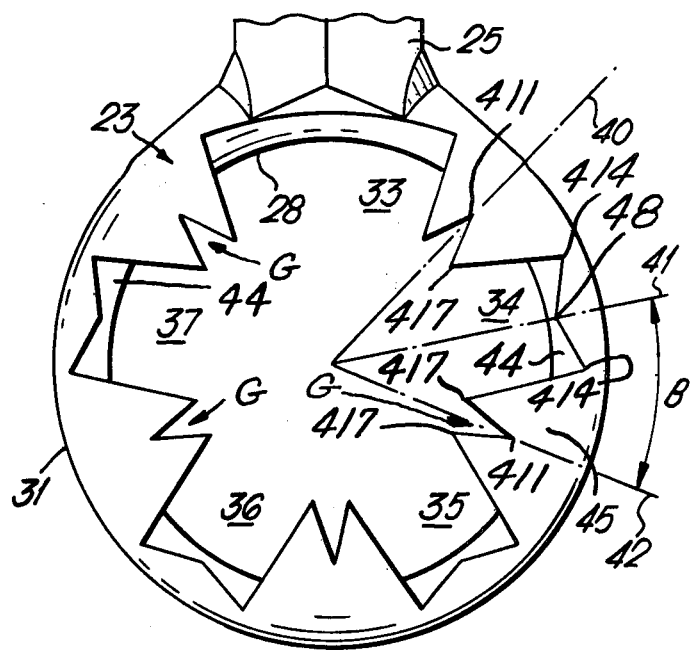
FIG. 3 is an enlarged view on arrow A in FIG. 2.

In the end view of mixer 23 shown in FIG. 3, the nacelle structure and the exhaust bullet has been removed for the sake of clarity. The outer circumferential line 31 in FIG. 3 is therefore the same as highspot 31 in FIG. 2, where mixer 23 is being blended into the rear of engine core 3. This end view shows that the mixer 23 has five "lobes" 33 to 37 through which portions of the hot turbine exhaust stream pass. The lobes each comprise a left hand half and a right hand half and occupy equi-angled sectors of a circle, except for the top lobe 33 which is of greater angular extent to allow for the presence of pylon 25 at top dead centre. Lobe 33 is also modified in shape to blend aerodynamically with pylon 25.

It will be seen from FIG. 3 that the trailing edges of the flow surfaces which define the opposing sides of each of the lobes 34 to 37 (exemplified by trailing edge 414–417 in FIG. 4) are straight and very approximately parallel to each other. However, their relative angles may be altered in a suitable design without altering the principles of the invention.

The short axial length and high mixing efficiency of mixer 23 are achieved by forming it from an array of twisted flow surfaces, such as flow surface 45, which is the fan-air-contacting-surface of the right hand half of lobe 34. The particular geometrical shape of the flow surfaces are explained below.

For the purposes of the present description, a complete "lobe" will be defined as extending from the mid-point of the trough between two lobes to the next angularly adjacent mid-point, such as between radial line 40 and radial line 42 in FIG. 3, the angular extent of a "half-lobe" therefore being exemplified by sector B between radial lines 41 and 42.

Figure 4:
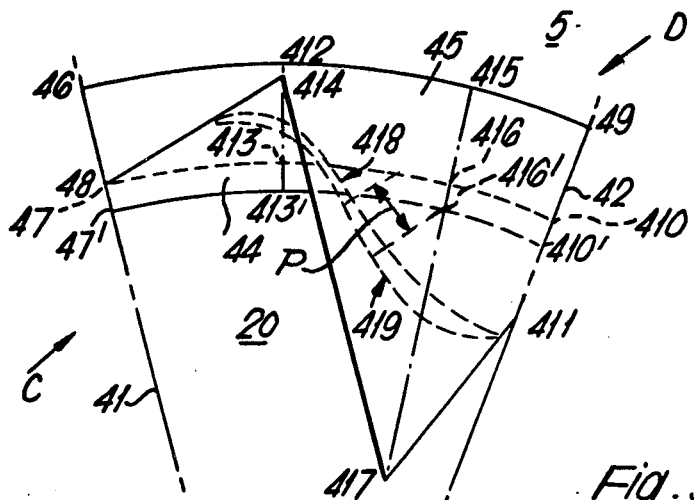
FIG. 4 is an enlarged view of sector B in FIG. 3, to help illustrate the geometry of the mixer body in this sector.
Figure 5:
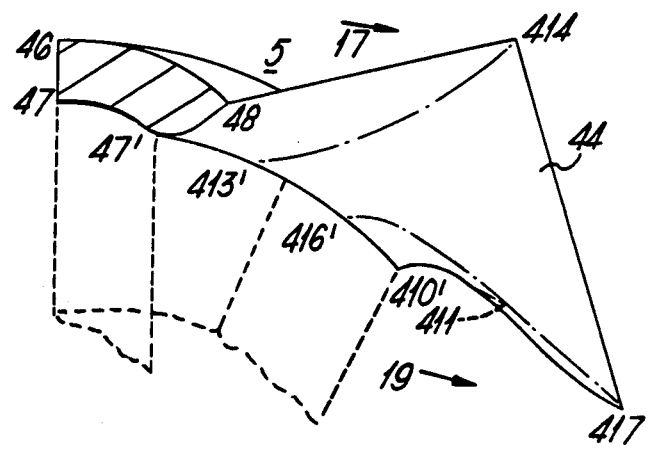
FIG. 5 is a view in the direction of arrow C in FIG. 4.
Figure 6:
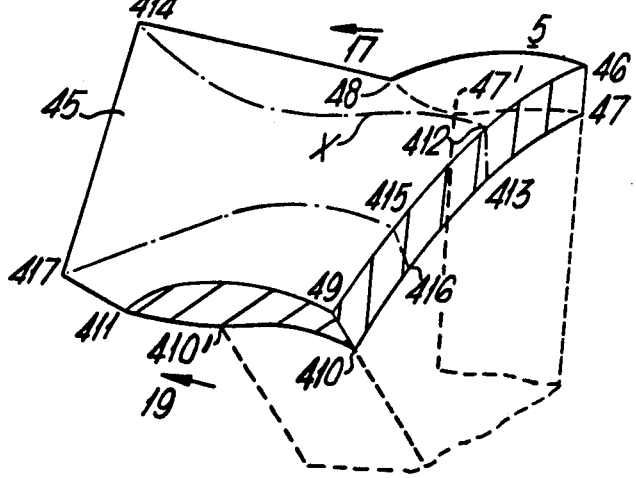
FIG. 6 is a view in the direction of arrow D in FIG. 4.

The geometry of the half-lobe in sector B, being typical of the other half-lobes, will now be described with reference to FIGS. 4 to 6. FIG. 4 is an end-view of the half-lobe, adjacent half-lobes being mirror images to the left of line 41 and to the right of line 42. FIGS. 5 and 6, being views on arrows C and D respectively in FIG. 4, are perspective views of the half-lobe in FIG. 4, FIG. 5 being an oblique view of the inner flow surface (i.e. the turbine exhaust stream contacting surface of the half-lobe), and FIG. 6 being an oblique view of the outer flow surface 45 (i.e. the fan air stream contacting surface) of the half-lobe. Radially inner surface 44 of the half-lobe is thus a rearward continuation of the radially outer surface 28 of the turbine outlet duct 20 (FIG. 2), which is the same as the circular arc 47,413,416,410 in FIGS. 4 to 6.

The radially outer surface 45 of the half-lobe is similarly a rearward continuation of the radially inner surface of the bypass duct 5, represented by the circular arc 46,412,415,49 in FIGS. 4 to 6, which is part of the circumferential line 31 in FIG. 3. The annular space between the two circular arcs 47–410 and 46–49 is of course the structure of the rearmost end of the engine core 3.

In FIGS. 5 and 6, the half-lobe is shown as sectioned in a sectoral plane (this includes points 47,46,412,415,49,410,415,413 on the half-lobe) and in the two radial planes defined by lines 41 and 42 in FIG. 4 (which include points 46,47,48 and 48,410,411 respectively on the half-lobe). The shape of the half-lobe being examined, and of course the shape of the mixer as a whole, is such as to bring the radially inner surface 31 of the bypass duct 5 and the radially outer surface 28 of the turbine outlet duct 20 together rearwardly of the engine core so that the hot turbine exhaust stream and the cooler fan air stream can mix together rearwardly of the trailing edge 48,414,417,411 of the half-lobe. Trailing edge portions 48–414,414–417 and 417–411 together form a Z-shape as seen in FIG. 4. Although the three trailing edge portions mentioned are straight lines in this embodiment of the invention, they could be curved lines if desired without going outside the scope of the invention. Similarly, the points 48,414,417 and 411 are shown as sharp corners at the junctions of the straight trailing edge portions, but they may be radiused to a U-shape or similar without departing from the invention.

On FIG. 4 it can be seen that both of the surfaces 44 and 45 have latitudinal contours which exhibit a longitudinal (axial or streamwise) transition from a circular arc to a Z-shaped trailing edge in order to produce the lobed shape of the rear end of the mixer (note that the three limbs of the Z-shape all occupy different planes of reasons which will be explained later). To achieve this transition in a gradual and aerodynamically smooth way, the arcs 46–49 and 47–410 gradually become somewhat S-shaped in the rearward direction, so that at stations longitudinally intermediate the forward end of the half-lobe and its rearmost trailing edge portion 414–417, the latitudinal contours of the radially outer and inner surfaces 45 and 44 respectively are as shown by the dashed lines 418 and 419 respectively, i.e. they are sinuous shapes, each with a single inflexion and having an intermediate portion P between the convex and concave portions, the intermediate portion partially delineating the opposed sides of the lobes and troughs.

At a certain longitudinally intermediate position or station the S-shaped contours are most pronounced or accentuated and then become less pronounced or accentuated at more downstream stations. The inflexion ceases at point 414 so that latitudinal contours downstream of this position are curved in one sense only, i.e. concavely as seen from above the flow surface 45 in FIG. 4.

The development of the shapes of the surfaces 45 and 44 will now be described in more detail in terms of a progression from the sectoral plane including arcs 46–49 and 47–410 rearwards to the three trailing edge portions.

Two chain-dashed lines in FIG. 6 trace two longitudinal contours of surface 45. One contour extends between trailing edge corner 414 and a point 412 on arc 46–49, points 412 and 414 both being in a radial plane extending from the longitudinal axis of the exhaust stream mixer 23, this plane also including point 413 on arc 47–410. The other axial contour shown on FIG. 6 extends between trailing edge corner 417 and a point 415 on arc 46–49, points 415 and 417 both being in another radial plane extending from the longitudinal axis of the exhaust stream mixer 23, this plane also including point 416 on arc 47–410.

Immediately rearward of arc 46–49 in FIG. 6, surface 45 is almost spherical in shape. This is shown by contours 412–414 and 415–417 but is best seen looking at lines 46 to 48 and 49 to 411. In fact, the radius of curvature is somewhat less than that of a sphere, so the shape produced is part of a torus.

At a point quite near 412 between 412 and 414 the surface 45 begins to bulge outwards in a gradual and progressive manner as the latitudinal contour changes from convex to concave and climbs outwards toward point 414. Point X is the point of inflexion where the longitudinal contour changes from convex to concave. As this bulge rises out of the basic surface, the radius of curvature of contour lines 412–414 increases progressively to infinity at trailing edge point 414, i.e. near trailing edge point 414, contour line 412–414 is effectively a straight line climbing outwards to point 414. Latudinal contour line 418 on FIG. 4 is convexly curved at its upper end as a result of this bulging, whose purpose is to divide the fan steam air coming over point 412 in an aerodynamically smooth manner either side of line 412–414 and help it to flow towards points 48 and 417 on the trailing edge of surface 45.

A similar and complementary bulging takes place on inner surface 44 along chain-dashed longitudinal contour line 416'–417 in FIG. 5, as shown by the convex curvature of the lower part of latitudinal contour line 419 in FIG. 4. The purpose of the bulging on this part of surface 44 is to smoothly divide the turbine exhaust stream passing over the point 416' to either side of line 416'–417 and help it to flow towards points 411 and 414 on the trailing edge of surface 44.

The other longitudinal contour line 415–417 on surface 45 shows the transition from the toroidal surface near point 415 to a contour which, whilst somewhat concave in the latitudinal direction as shown by the lower end of contour line 418 in FIG. 4, is a straight line in the longitudinal direction plunging steeply inwards to point 417 on the trailing edge. This trough-like contour is intended to direct part of the fan air stream inwards and rearwards to promote forced mixing by projecting it into the turbine exhaust stream.

A similar and complementary transition to produce the outwardly bulging lobe shape on surface 44 is illustrated by longitudinal contour line 413'–414 in FIG. 5 and the upper part of latitudinal contour line 419 on FIG. 4. This is intended to direct part of the turbine exhaust stream outwards and rearwards to promote forced mixture by projecting it into the fun air stream.

By virtue of their transition from arcs of circles at their forward ends to trailing edges which are oriented transversely of those arcs, the surfaces 44,45 are twisted between their forward (upstream) and their rearward (downstream) ends. Thus, the fan air coming over arc 412–415 is intended to reach trailing edge portion 414 to 417 having been given radially inward and cloekwise rotational velocity components by virtue of the overall clockwise twist in the intervening surface 45. Similarly, the turbine exhaust coming over arc 413' to 416' is intended to reach trailing edge portion 414 to 417 having been given radially outward and clockwise rotational velocity components by virtue of the overall clockwise twist in the intervening surface 44.

Hence, downstream of the trailing edge portion 414–417, these components of flow will continue as a double helix of turbine exhaust and fan air, the helical flow being a very effective mixing action.

Similar but less pronounced anticlockwise helical flows will occur downstream of trailing edge portions 48–414 and 417–411. Note that adjacent half-lobes are mirror images of each other, and this results in the net helical motion in the combined exhaust streams being substantially zero.

Note that the twisted surfaces 44 and 45 do not have a constant rate of rotation about a twist axis in the longitudinal (downstream) direction of each surface. The non-uniform progressive twist of the surfaces enable good aerodynamic characteristics to be achieved, the degree of twist per unit length of the flow surface being greater at their downstream ends than their upstream ends.

An important point about the effectiveness of the embodiment being described is the way in which the trailing edge 414–417 is scarfed, i.e. point 417 is further rearward than point 414. This is best seen in FIGS. 2 and 5. Combined with the fact that point 417 is radially inwards of point 414 by virtue of the clockwise twist in the surfaces 44 and 45, this gives good penetration of the fan air into the turbine exhaust stream, whilst keeping the mixer axially short. Note also in FIG. 2 the deep upstream converging V-shaped gashes G apparent in the perimeter of the mixer, where adjacent flows surfaces of opposite twists are not contiguous with each other. These gashes G are caused by chosing to make the edge portions such as 48–414 and 417–411 (FIG. 6) to be straight lines in order that they should be as short as possible given the desired radial and axial positions of points 414 and 417 with respect to the centreline of the turbofan. Since edges 48–414 and 411–417 are kept short, aerodynamic losses due to flow over them are minimised. Further, the resulting deep V-gashes G assist progressive contact and mixing between portions of the fan air and turbine exhaust before the two streams have passed the rear end of the mixerbody.

In structural terms, the inner and outer surfaces 44,45 are two sheet metal skins which are joined directly together at their trailing edges but which are otherwise spaced apart from each other by varying amounts according to which portion of the half-lobe is being considered. This spacing apart of the two skins is illustrated by the space enclosed by the two contour lines 418 and 419 in FIG. 4 and also by the shaded section in FIGS. 5 and 6. The two skins are preferably the two sides of a honeycomb sandwich type of structure, both skins being welded or brazed to the honeycomb to produce a light, strong and flexurally stiff structure.

Two spaced—apart skins are used because:

(a) smooth flow over surfaces 44,45 is best achieved by keeping them separate and specifically shaped for their separate flow turning functions;

(b) Separate skins with internal bracing, such as a honeycomb sandwich construction, are stronger and/or lighter than a single skin to resist the aerodynamic loads put on them, and being stiffer are less subject to vibrations excited by the flows over them;

(c) One or both of the skins may be perforated and the space between the skins utilised for sound attenuation by resonance effects or by means of a filling of sound attenuating foam or fibrous material.

I claim:

1. For a turbofan aeroengine, an exhaust mixer of the type comprising a plurality of lobes, through which portions of a turbine exhaust stream pass, and a plurality of troughs defined between said lobes, through which troughs portions of a fan air stream pass, said lobes and said troughs being at least partially defined by turbine exhaust stream contacting flow surfaces and fan air stream contacting flow surfaces respectively whereby each said lobe and each said trough has generally opposed sides extending longitudinally of said turbine exhaust and fan air streams, one such side of each of said lobes and troughs comprising a flow surface portion having a longitudinal clockwise progressive twist between its upstream and downstream ends and the other such side of each of said lobes and troughs comprising a flow surface portion having a similar but anticlockwise twist, said flow surfaces being shaped such that latitudinal contours of said flow surfaces at a succession of stations downstream of their upstream ends are sinuous shapes each with a single inflexion, said sinuous latitudinal contours having outwardly convex portions which at least partly delineate outer portions of said lobes, inwardly concave portions which at least partly delineate inner portions of said troughs, and intermediate portions between said outwardly convex and inwardly concave portions, which intermediate portions at least partially delineate said opposed sides of said lobes and troughs.

2. For a turbofan aeroengine, an exhaust mixer having turbine exhaust stream contacting flow surfaces which together at least partially define lobes through which portions of said turbine exhaust stream pass, and fan air stream contacting flow surfaces which together at least partially define troughs between said lobes through which troughs portions of said fan air stream pass, said flow surfaces having a longitudinal and progressive twist between their upstream and downstream ends such that opposing sides of each said lobe and each said trough comprise flow surface portions having opposed senses of twist and the shape of said flow surfaces being such that transverse of the stream-wise direction latitudinal contours of said flow surfaces at a succession of stations downstream of their upstream ends are sinuous shapes each with a single inflexion, said sinuous latitudinal contours having outwardly convex portions which at least partly delineate outer portions of said lobes, inwardly concave portions which at least partly delineate inner portions of said troughs, and intermediate portions between said outwardly convex and inwardly concave portions, which intermediate portions at least partially delineate said opposed sides of said lobes and troughs.

3. An exhaust mixer of the multi-lobed type for a turbofan aeroengine, wherein portions of the turbine exhaust stream pass through the lobes, and portions of the fan air stream pass through troughs between said lobes, each lobe and each trough being at least partially defined by flow surfaces having upstream and downstream ends, said flow surfaces having latitudinal contours transverse of the streamwise direction which steadily change from uninflected curves extending peripherally of said turbine exhaust stream at said upstream ends of said flow surfaces, to sinuous curves with a single inflexion at a succession of stations downstream of said upstream ends of said flow surfaces, said flow surfaces having progressive longitudinal twist between their upstream and downstream ends such that opposing sides of each lobe and each trough comprise flow surface portions having opposed senses of twist, said opposed sides being at least partially delineated by midportions of said sinuous curves, outer portions of said lobes being at least partly delineated by outwardly convex portions of said sinuous curves, and inner portions of said troughs being at least partly delineated by inwardly concave portions of said sinuous curves.

4. An exhaust mixer according to any one of claims 1 to 3 in which said latitudinal contours of said flow surfaces steadily change from said sinuous shapes at a succession of stations intermediate said upstream and downstream ends of said flow surfaces, to uninflected curves at a succession of stations approaching said downstream ends of said flow surfaces, said uninflected curves having outwardly extending portions which at least partly delineate downstream portions of said opposed sides of said lobes and troughs, and inwardly concave portions which at least partly delineate downstream inner portions of said troughs.

5. An exhaust mixer according to any one of claims 1 to 3 in which said progressive twist between said upstream and downstream ends of said flow surfaces is non-uniform in that the degree of twist per unit length of said flow surfaces is greater near their downstream ends than at their upstream ends.

6. An exhaust mixer according to any one of claims 1 to 3 in which peripherally adjacent ones of said flow surfaces are not contiguous with each other over at least their downstream portions, whereby said outer portions of said lobes and said inner portions of said troughs are provided with substantially V-shaped gashes extending convergently upstream from the downstream ends of said lobes and troughs.

7. An exhaust mixer according to any one of claims 1 to 3 in which said downstream ends of said flow surface portions comprising said inner portions of said troughs are further downstream than said downstream ends of said flow surface portions comprising said outer portions of said lobes.

8. An exhaust mixer according to anyone of claims 1 to 3 in which said flow surfaces have downstream edges composed of straight lines.

9. An exhaust mixer according to claim 8 in which said downstream edge of each said flow surface is substantially Z-shaped when seen in endelevation.

* * * * *